(12) United States Patent
Pereira et al.

(10) Patent No.: US 9,962,644 B2
(45) Date of Patent: May 8, 2018

(54) PROCESS FOR INCREASED SELECTIVITY AND CAPACITY FOR HYDROGEN SULFIDE CAPTURE FROM ACID GASES

(71) Applicants: ExxonMobil Research and Engineering Company, Annandale, NJ (US); BASF, Ludwigshafen (DE)

(72) Inventors: Carla S. Pereira, Somerville, NJ (US); Michael Siskin, Westfield, NJ (US); Thomas Ingram, Mannheim (DE); Gerald Vorberg, Speyer (DE); Martin Ernst, Heidelberg (DE)

(73) Assignees: ExxonMobil Research and Engineering Company, Annandale, NJ (US); BASF, Ludwigshafen (DE)

( * ) Notice: Subject to any disclaimer, the term of this patent is extended or adjusted under 35 U.S.C. 154(b) by 75 days.

(21) Appl. No.: 14/980,634

(22) Filed: Dec. 28, 2015

(65) Prior Publication Data

US 2017/0182455 A1    Jun. 29, 2017

(51) Int. Cl.
| | | |
|---|---|---|
| *B01D 53/52* | (2006.01) | |
| *B01D 53/78* | (2006.01) | |
| *B01D 53/14* | (2006.01) | |
| *B01D 53/18* | (2006.01) | |
| *C10L 3/10* | (2006.01) | |

(52) U.S. Cl.
CPC ..... *B01D 53/1493* (2013.01); *B01D 53/1425* (2013.01); *B01D 53/1468* (2013.01); *B01D 53/18* (2013.01); *C10L 3/10* (2013.01); *B01D 2252/204* (2013.01); *B01D 2252/20431* (2013.01); *B01D 2252/20478* (2013.01); *B01D 2252/20489* (2013.01); *B01D 2257/304* (2013.01); *B01D 2257/504* (2013.01)

(58) Field of Classification Search
None
See application file for complete search history.

(56) References Cited

U.S. PATENT DOCUMENTS

| | | |
|---|---|---|
| 4,093,701 A | 6/1978 | Butwell |
| 4,112,052 A | 9/1978 | Sartori et al. |
| 4,405,581 A | 9/1983 | Savage et al. |

(Continued)

FOREIGN PATENT DOCUMENTS

WO    2015065839 A1    5/2015

OTHER PUBLICATIONS

Partial International Search Report and Written Opinion PCT/US2016/064529 dated Mar. 3, 2017.

(Continued)

*Primary Examiner* — Daniel Berns
(74) *Attorney, Agent, or Firm* — Jones Walker LLP

(57) ABSTRACT

A process for selectively separating $H_2S$ from a gas mixture which also comprises $CO_2$ is disclosed. A stream of the gas mixture is contacted with an absorbent solution comprising one or more amines, alkanolamines, hindered alkanolamines, capped alkanolamines, or mixtures thereof. The $H_2S/CO_2$ selectivity of the absorbent solution is preferably greater than about 4.0 for an acid gas loading [mol($CO_2$+$H_2S$)/mol(amine)] between about 0.2 and about 0.6, and is achieved by reducing pH of the absorbent solution.

9 Claims, 9 Drawing Sheets

Note: Dashed lines - M3ETB + Phosphoric acid (2 experiments under same conditions);
full line – M3ETB solution.

(56) References Cited

U.S. PATENT DOCUMENTS

| | | |
|---|---|---|
| 4,405,583 A | 9/1983 | Stogryn et al. |
| 4,405,585 A | 9/1983 | Sartori et al. |
| 4,471,138 A | 9/1984 | Stogryn |
| 4,894,178 A | 1/1990 | Ho et al. |
| 8,486,183 B2 | 7/2013 | Siskin et al. |
| 2010/0037775 A1* | 2/2010 | Siskin ................ B01D 53/1456 95/235 |
| 2013/0243676 A1 | 9/2013 | Siskin et al. |
| 2013/0243677 A1* | 9/2013 | Siskin ................ B01D 53/1468 423/228 |
| 2015/0027055 A1 | 1/2015 | Kortunov et al. |

OTHER PUBLICATIONS

International Search Report and Written Opinion PCT/US2016/064529 dated Apr. 26, 2017.

* cited by examiner

Note: Dashed lines - M3ETB + Phosphoric acid (2 experiments under same conditions); full line – M3ETB solution.

Note: Dashed lines - M3ETB + Phosphoric acid (2 experiments under same conditions); full line – M3ETB solution.

PROCESS FOR INCREASED SELECTIVITY AND CAPACITY FOR HYDROGEN SULFIDE CAPTURE FROM ACID GASES

BACKGROUND

The present invention relates to a process for removing acid gases from natural gas and other gas streams. In particular, it relates to a process for increasing the selectivity and capacity for hydrogen sulfide removal from a natural gas stream using aqueous amine absorbents.

A number of different technologies are available for removing acid gases such as carbon dioxide, hydrogen sulfide, carbonyl sulfide. These processes include, for example, chemical absorption (amine/alkanolamine), physical absorption (solubility, e.g., organic solvent, ionic liquid), cryogenic distillation (Ryan Holmes process), and membrane system separation. Of these, amine separation is a highly developed technology with a number of competing processes in hand using various amine/alkanolamine sorbents such as monoethanolamine (MEA), diethanolamine (DEA), triethanolamine (TEA), N-methyldiethanolamine (MDEA), diisopropylamine (DIPA), diglycolamine (DGA), 2-amino-2-methyl-1-propanol (AMP) and piperazine (PZ). Of these, MEA, DEA, and MDEA are the ones most commonly used. The acid gas scrubbing process using an amine in the purification process usually involves contacting the gas mixture countercurrently with an aqueous solution of the amine in an absorber tower. The liquid amine stream is then regenerated by desorption of the absorbed gases in a separate tower with the regenerated amine and the desorbed gases leaving the tower as separate streams. The various gas purification processes which are available are described, for example, in Gas Purification, Fifth Ed., Kohl and Neilsen, Gulf Publishing Company, 1997, ISBN-13: 978-0-88415-220-0.

It is often necessary or desirable to treat acid gas mixtures containing both $CO_2$ and $H_2S$ so as to remove the $H_2S$ selectively from the mixture while minimizing removal of the $CO_2$. While removal of $CO_2$ may be necessary to avoid corrosion problems and provide the required heating value to the consumer, selective $H_2S$ removal may be necessary or desirable. Natural gas pipeline specifications, for example, set more stringent limits on the $H_2S$ level than on the $CO_2$ since the $H_2S$ is more toxic and corrosive than $CO_2$: common carrier natural gas pipeline specifications typically limit the $H_2S$ content to 4 ppmv with a more lenient limitation on the $CO_2$ at 2 vol %. Selective removal of the $H_2S$ may enable a more economical treatment plant to be used and selective $H_2S$ removal is often desirable to enrich the $H_2S$ level in the feed to a sulfur recovery unit.

The reaction kinetics with hindered amine sorbents allow $H_2S$ to react more rapidly with the amine groups of the sorbent to form a hydrosulfide salt in aqueous solution, but under conditions of extended gas-liquid contact where equilibrium of the absorbed sulfide species with $CO_2$ is approached, carbon dioxide can displace hydrogen sulfide from the previously absorbed hydrosulfide salt since carbon dioxide is a slightly stronger acid in aqueous solution than hydrogen sulfide (ionization constant for the first ionization step to $H^+$ and $HCO_3^-$ is approximately $4 \times 10^{-7}$ at 25° C. compared to $1 \times 10^{-7}$ for the corresponding hydrogen sulfide ionization) so that under near equilibrium conditions, selective $H_2S$ removal becomes problematical, presenting a risk of excessive $H_2S$ levels in the effluent product gas stream.

An improvement in the basic amine process involves the use of sterically hindered amines. U.S. Pat. No. 4,112,052, for example, describes the use of hindered amines for nearly complete removal of acid gases including $CO_2$ and $H_2S$. U.S. Pat. Nos. 4,405,581; 4,405,583; 4,405,585 and 4,471,138 disclose the use of severely sterically hindered amine compounds for the selective removal of $H_2S$ in the presence of $CO_2$. Compared to aqueous MDEA, severely sterically hindered amines lead to much higher selectivity at high $H_2S$ loadings. Amines described in these patents include BTEE (bis(tertiary-butylamino)-ethoxy-ethane synthesized from tertiary-butylamine and bis-(2-chloroethoxy)-ethane as well as EEETB (ethoxyethoxyethanol-tertiary-butylamine) synthesized from tertiary-butylamine and chloroethoxyethoxy-ethanol). U.S. Pat. No. 4,894,178 indicates that a mixture of BTEE and EEETB is particularly effective for the selective separation of $H_2S$ from $CO_2$. U.S. Pat. No. 8,486,183 describes the preparation of alkoxy-substituted etheramines as selective sorbents for separating $H_2S$ from $CO_2$.

The use of hydroxyl-substituted amines (alkanolamines) such as those mentioned above has become common since the presence of the hydroxyl groups tends to improve the solubility of the absorbent/acid gas reaction products in the aqueous solvent systems widely used, so facilitating circulation of the solvent through the conventional absorber tower/regeneration tower unit. This preference may, however, present its own problems in certain circumstances. A current business driver is to reduce the cost to regenerate and to recompress acid gases prior to sequestration. For natural gas systems, the separation of the acid gases can occur at pressures of about 4,800-15,000 kPaa (about 700-2,200 psia), more typically from about 7,250-8,250 kPaa (about 1050-1200 psia). While the alkanolamines will effectively remove acid gases at these pressures, the selectivity for $H_2S$ removal can be expected to decrease markedly both by direct physisorption of the $CO_2$ in the liquid solvent and by reaction with the hydroxyl groups on the amine compound. Although the $CO_2$ reacts preferentially with the amino nitrogen, higher pressures force reaction with the oxygens and under the higher pressures, the bicarbonate/hemicarbonate/carbonate reaction product(s) formed by the reaction at the hydroxyl site is stabilized with a progressive loss in $H_2S$ selectivity with increasing pressure. This effect can be perceived, for example, with MDEA (N-methyldiethanolamine). For example, 5M MDEA in aqueous solution does not absorb carbon dioxide under ambient conditions, but will form a hydrosulfide salt at the nitrogen. However, $H_2S/CO_2$ selectivity significantly reduces at high $CO_2$ pressure presumably due to O-carbonation of hydroxyl groups:

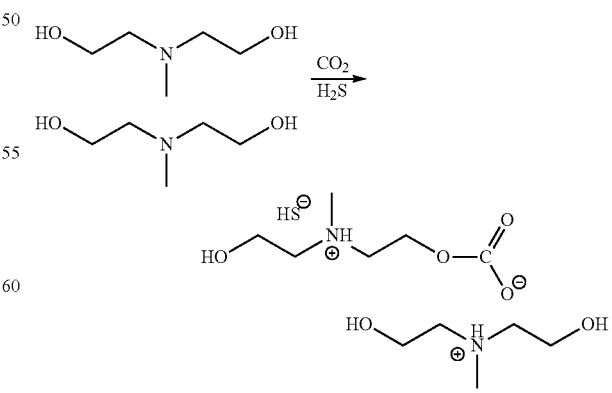

A similar trend is observed with the secondary aminoether, ethoxyethoxyethanol-t-butylamine (EEETB): at low pressures, this absorbent offers $H_2S$ selectivity over $CO_2$ based on a faster reaction with the hindered secondary amine group although a significant amount of $CO_2$ can be absorbed by the hydroxyl group which has low affinity to $H_2S$. At higher pressures, however, the reaction yield of O-carbonation increases, suppressing the $H_2S/CO_2$ selectivity achieved by the hindered secondary amine:

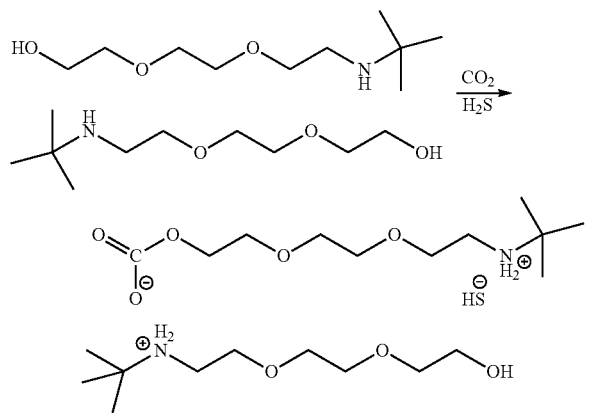

U.S. 2015/0027055 describes an absorbent system that can selectively absorb $H_2S$ from gas mixtures that also contain $CO_2$ and that can be regenerated at high pressure (greater than 10 bara) while maintaining very low $CO_2$ solubility. The absorbent may include capped alkanolamines, i.e., alkanolamines in which one or more of the hydroxyl groups have been capped or converted into ether groups, including N-(2-methoxyethyl)-N-methyl-ethanolamine (MDEA-(OMe)), Bis-(2-methoxyethyl)-N-methyl-amine (MDEA-(OMe)$_2$), 2-amino-prop-1-yl methyl ether (AP-OMe), 2-methyl-2-amino-prop-1-yl methyl ether (AMP-OMe), 2-N-methylamino-prop-1-yl methyl ether (MAP-OMe), 2-N-methylamino-2-methyl-prop-1-yl methyl ether (MAMP-OMe), 2-N-ethylamino-2-dimethyl-prop-1-yl methyl ether, (EAMP-OMe), 2-(N,N-dimethylamino)-ethyl methyl ether (DMAE-OMe), and Methoxyethoxyethoxy-ethanol-t-butylamine (M3ETB). The absorbent may also include more basic sterically hindered secondary and tertiary amines, including guanidines, amidines, biguanides, piperidines, piperazines, and the like, such as tetramethylguanidine, pentamethylguanidine, 1,4-dimethylpiperazine, 1-methylpiperidine, 2-methylpiperidine, 2,6-dimethylpiperidine, their hydroxyalkyl, e.g., hydroxyethyl derivatives, and mixtures thereof.

In spite these advancements in absorbents, there still remains a need for an absorption system that maintains a high selectivity and absorption capacity for $H_2S$ over a wide range of loadings.

SUMMARY OF THE INVENTION

We have now found that it is possible to achieve improved selectivity for the removal of $H_2S$ from gas mixtures also containing $CO_2$ by controlling the pH of the absorbent system. According to the present invention, a method for reducing the pH of an amine/alkanolamine absorbent system is utilized to favor bicarbonate versus carbonate and/or hydrosulfide formation to maximize the stoichiometry of absorption. In a first aspect of the present invention, the concentration of the amine/alkanolamine absorbent is reduced, resulting in the system having a lower pH. In a second aspect of the present invention, the pH of the amine/alkanolamine absorbent system is reduced by adding an acid to the system. The lower pH favors bicarbonate formation, increasing acid gas ($H_2S$ and $CO_2$) loading, and increasing the selectivity of $H_2S$ over $CO_2$ over a broad loading range. Particular amines that are found useful in the present invention are amines and alkanolamines, preferably sterically hindered amines and alkanolamines, and most preferably capped, sterically hindered amines such as methoxyethoxyethoxyethanol-t-butylamine (M3ETB).

According to the present invention, a process for selectively separating $H_2S$ from a gas mixture which also comprises $CO_2$, the process comprising contacting a stream of the gas mixture with an absorbent solution comprising one or more amines, wherein the $H_2S/CO_2$ selectivity of the absorbent solution is greater than about 4.0, and preferably above about 5.0, for an acid gas loading [mol($CO_2$+$H_2S$)/mol(amine)] between about 0.2 and about 0.6. Such a process also demonstrates superior $H_2S$ selectivity at relatively low acid gas loadings (up to 0.3 [mol($CO_2$+$H_2S$)/mol(amine)]).

Additional advantages of the present invention include reduced chemical costs (directly related to reduced amine usage), reduced viscosity resulting in reduced circulation energy, reduced corrosivity of the absorption system, and reduced energy required to regenerate the reduced volume of amine.

DETAILED DESCRIPTION

Figure 1:
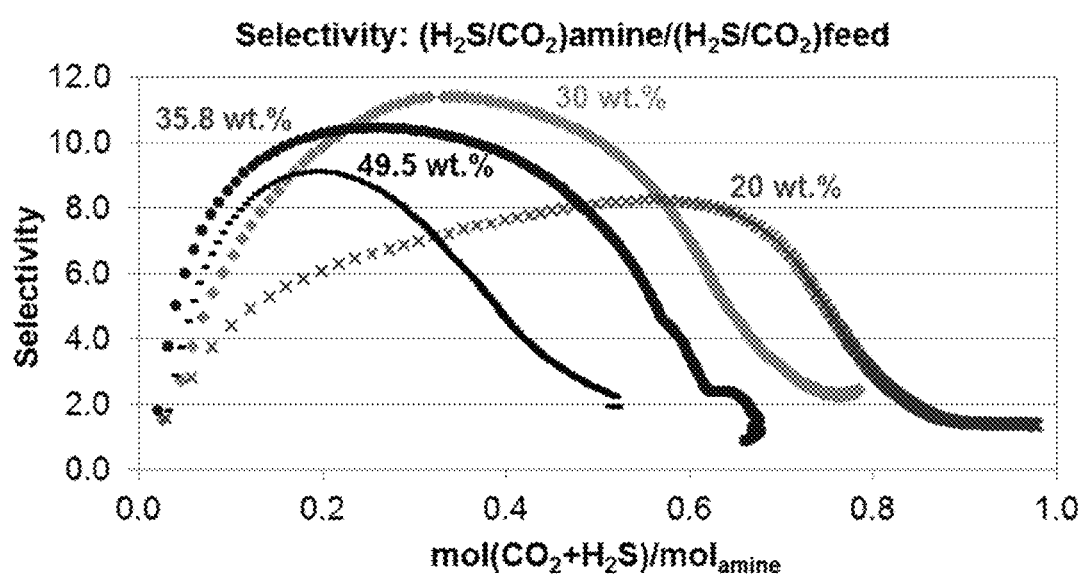
FIG. 1 is a plot of the selectivity of $H_2S$ over $CO_2$ as a function of acid gas loading with different concentrations of M3ETB aqueous solutions.

Conventional wisdom within the art of acid gas treating is that tertiary amines in general form bicarbonates preferentially in reaction with $CO_2$ in aqueous solution. Although hindered secondary amines are also able to form a carbamate with $CO_2$, the bicarbonate route becomes the preferred route as steric hindrance increases. For absorption systems using tertiary and sterically hindered amines, it is well known that there is a rapid equilibrium between bicarbonate and carbonate formation as shown below:

| H$_2$S (Acid Base) | Stoichiometry | Rate |
|---|---|---|
| H$_2$S + Amine ⇌ AmineH$^+$ + HS$^-$ | 1.0 | Very fast |
| CO$_2$ (Acid Base) | 0.5 | Slow |
| [reaction scheme showing CO$_2$ + H$_2$O → carbonic acid reacting with hindered amine to form carbonate (equil.) and bicarbonate] | 1.0 | |

Because of their 1:1 stoichiometry with the amine group, the bicarbonate route is more desirable because it favors enhanced selectivity for the absorption of CO$_2$ and also for H$_2$S as the mercaptide salt in acid gas removal processes. However, at the high pH of ~12 of the initial loading of the amine in aqueous solution carbonate formation is favored, but that ties up two amine molecules for acid gas capture, providing a less favorable 0.5:1 stoichiometry. Furthermore, at higher amine concentrations, there is less water available facilitating higher pH.

Described herein is a method for controlling/reducing the pH of a hindered amine/alkanolamine absorbent system to favor bicarbonate versus carbonate and/or hydrosulfide formation to maximize the stoichiometry of absorption.

In a first aspect of the present invention, the pH of the hindered amine/alkanolamine absorbent system is reduced. As demonstrated herein below, this reduced pH favors bicarbonate formation, increases acid gas (H$_2$S and CO$_2$) loading, and increases the selectivity of H$_2$S over CO$_2$ over a broad loading range.

In a second aspect of the present invention, the concentration of the hindered amine/alkanolamine absorbent is reduced, resulting in a diluted amine solution necessarily having a lower pH. As demonstrated herein below, this reduced pH favors bicarbonate formation, increases acid gas (H$_2$S and CO$_2$) loading, and increases the selectivity of H$_2$S over CO$_2$ over a broad loading range.

The effect of reducing the concentration of the hindered amine/alkanolamine absorbent is unexpected and counter-intuitive. Traditionally, one strives to increase the absorbent concentration in order to increase absorption. As demonstrated herein below, decreasing the weight percentage of hindered amine/alkanolamine absorbent in solution effectively reduces the amount of carbonate that can be formed and thereby increases the amount of free amine available for acid gas recovery as bicarbonate and hydrosulfide. Because absorption of H$_2$S is kinetically faster the selectivity for HS$^-$ formation is favored over HCO$_3^-$ formation. Additional advantages of the present invention include reduced chemical costs (directly related to reduced hindered amine/alkanolamine usage), reduced viscosity resulting in reduced circulation energy, reduced corrosivity of the absorption system, and reduced energy required to regenerate the higher loaded (1:1 stoichiometry), but reduced volume of hindered amine/alkanolamine.

In order to provide a better understanding of the foregoing, the following non-limiting examples are offered. Although the examples may be directed to specific embodiments, they are not to be viewed as limiting the invention in any specific respect.

The following experimental and analytical methods were used in the examples. The process absorption unit (PAU) is a semi-batch system, comprising a water saturator, a stirred autoclave to which gas can be fed in up-flow mode, and a condenser. The autoclave is equipped with a pressure gauge and a type J thermocouple. A safety rupture disc is attached to the autoclave head. A high wattage ceramic fiber heater is used to supply heat to the autoclave. The gas flows are regulated by Brooks mass flow controllers and the temperature of the condenser is maintained by a chiller. The maximum PAU working pressure and temperature are 1000 psi (69 bar) and 350° C., respectively.

During runs at atmospheric pressure, the pH of the solution is monitored in situ by using a Cole-Parmer pH probe installed in the bottom of the autoclave. This pH probe is limited by a maximum temperature and pressure of 135° C. and 100 psi, respectively. Therefore, before doing experiments at pressure, the pH probe is removed and the autoclave is capped. In both atmospheric and pressure runs, liquid samples are collected directly to a vial (atmospheric runs) or to a stainless steel cylinder (pressure runs).

A custom LabVIEW program is used to control the PAU operation and to acquire experimental data (temperature, pressure, stirrer speed, pH, gas flow rate, and off-gas concentration).

The experiments described herein below were performed by flowing the test acid gas mixture through the autoclave in which the amine solution was previously loaded. The acid gas mixture was fed to the bottom of the reactor by-passing the water saturator. The gases leaving the autoclave were transferred through the condenser (maintained at 10° C.) in order to remove any entrained liquids. A slip-stream of the off-gas leaving the condenser was piped to a micron-GC (Inficon) for analysis while the main gas flow passed through a scrubber. After reaching breakthrough, nitrogen was used to purge the system.

The off-gas composition was measured using a custom-built micro GC. The micro GC is configured as a refinery Gas Analyzer and includes four columns (Mole Sieve, PLOT U, OV-1, PLOT Q) and four TCD detectors. A slip stream of the off-gas was injected into the micro GC approximately every 2 minutes. A small internal vacuum pump was used to transfer the sample into the micro GC. The nominal pump rate was ~20 mL/min in order to achieve 10× the volume of line flushes between the sample tee and the micro GC. The actual gas injected into the micro GC was ~1 μL. The PLOT U column was used to separate and identify $H_2S$ and $CO_2$, and the micro TCD was used to quantify $H_2S$ and $CO_2$.

Table 1 below identifies each amine solution prepared in water (MW=18 g/mol; density=1 g/cm$^3$) for Example 1:

TABLE 1

| Amine | MW (g/mol) | Density (g/cm$^3$) | Molarity (mol$_{amine}$/L) | Conc$_{amine}$ (g$_{amine}$/L) | Conc$_{Water}$ (g$_{Water}$/L) | Wt. % Amine | $H_2O$:amine (mole ratio) |
|---|---|---|---|---|---|---|---|
| MDEA | 119.2 | 1.04 | 2.17 | 258.66 | 736.20 | 26 | 18.8 |
| MDEA | 119.2 | 1.04 | 3.05 | 363.56 | 646.33 | 36 | 11.8 |
| EETB | 161.2 | 0.94 | 2.17 | 349.80 | 621.87 | 36 | 15.9 |
| M3ETB | 219.3 | 0.92 | 2.17 | 475.88 | 485.49 | 49.5 | 12.4 |
| M3ETB | 219.3 | 0.92 | 1.59 | 348.69 | 619.89 | 36 | 21.7 |
| M3ETB | 219.3 | 0.92 | 1.34 | 293.86 | 685.68 | 30 | 28.3 |
| M3ETB | 219.3 | 0.92 | 0.90 | 197.37 | 789.48 | 20 | 48.5 |

Example 1—Selectivity Study

Three different amines were used to prepare amine absorbent solutions for Example 1. N-methyldiethanolamine (MDEA) is a commercially available, conventional amine treating absorbent having the following structure:

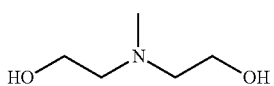

Ethoxyethanol-t-butylamine (EETB) is a commercially available, highly sterically hindered amine treating absorbent having the following structure:

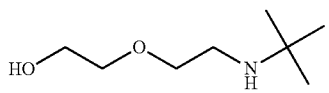

Methoxyethoxyethoxyethanol-t-butylamine (M3ETB) is a methyl capped, sterically hindered amine:

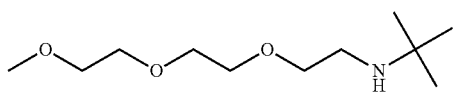

Test conditions for Example 1 were as follows: gas feed composition: 10 mol % $CO_2$, 1 mol % $H_2S$, balance $N_2$; gas flow rate: 154 sccm; temperature: 40.8° C., pressure: 1 bar; volume: 15 mL; stirring rate: 200 rpm.

Figure 2:
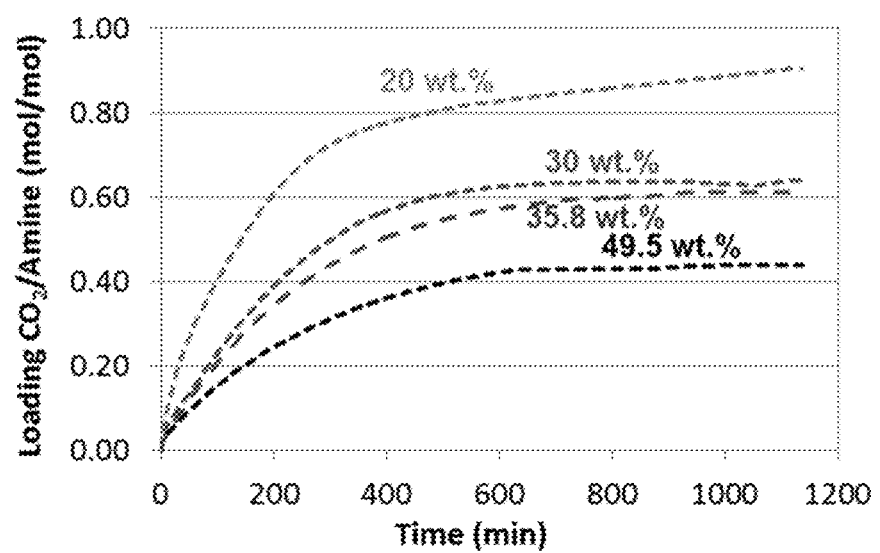
FIG. 2 is a plot of the $CO_2$ uptake as a function of treatment time by aqueous solutions of M3ETB.
Figure 3:
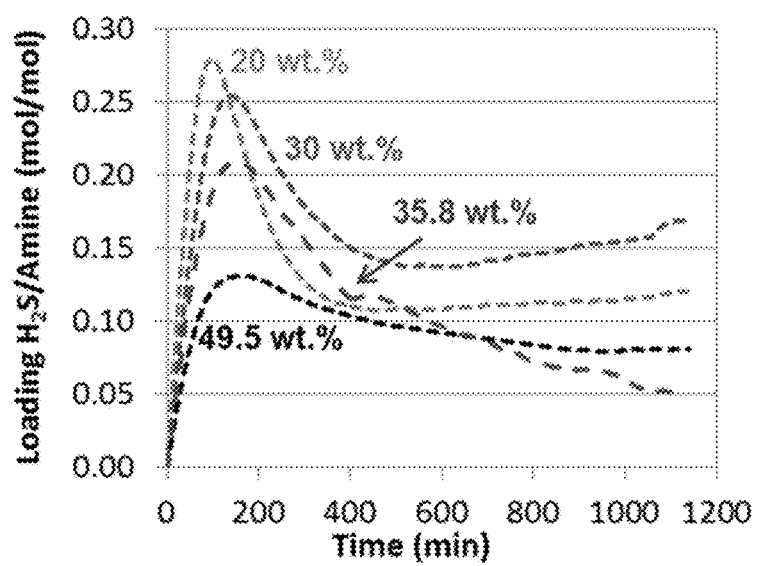
FIG. 3 is a plot of the $H_2S$ uptake as a function of treatment time by aqueous solutions of M3ETB.

FIG. 1 is a plot of the selectivity of $H_2S$ over $CO_2$ as a function of acid gas loading with different concentrations of M3ETB aqueous solutions. FIG. 2 is a plot of the $CO_2$ uptake as a function of treatment time by aqueous solutions of M3ETB. FIG. 3 is a plot of the $H_2S$ uptake as a function of treatment time by aqueous solutions of M3ETB.

The following conclusions are readily apparent from the plotted data of FIGS. 1-3. The initial lower selectivity (up to 0.2 mol/mol amine) of the 30 wt % M3ETB solution in FIG. 1 is due to higher $CO_2$ and $H_2S$ pickup (FIGS. 2 and 3, respectively) when compared to the 49.5 and 35.8 wt % M3ETB solutions. However, the higher selectivity (above 0.2 mol/mol amine) of the 30 wt % solution is primarily due to the significantly higher $H_2S$ pickup when compared to the 49.5 and 35.8 wt % M3ETB solutions. This increase in $H_2S$ pickup (FIG. 3) is directly related to increased initial bicarbonate formation versus carbonate formation, resulting in a higher amount of free amine for $H_2S$ capture. Importantly, FIG. 1 further demonstrates that the 30 wt % M3ETB solution yields an overall higher selectivity of $H_2S$ over $CO_2$ for the commercially desirable acid gas loading range of 0.2 to 0.6, when compared to the 49.5 and 35.8 wt % M3ETB solutions.

Figure 4:
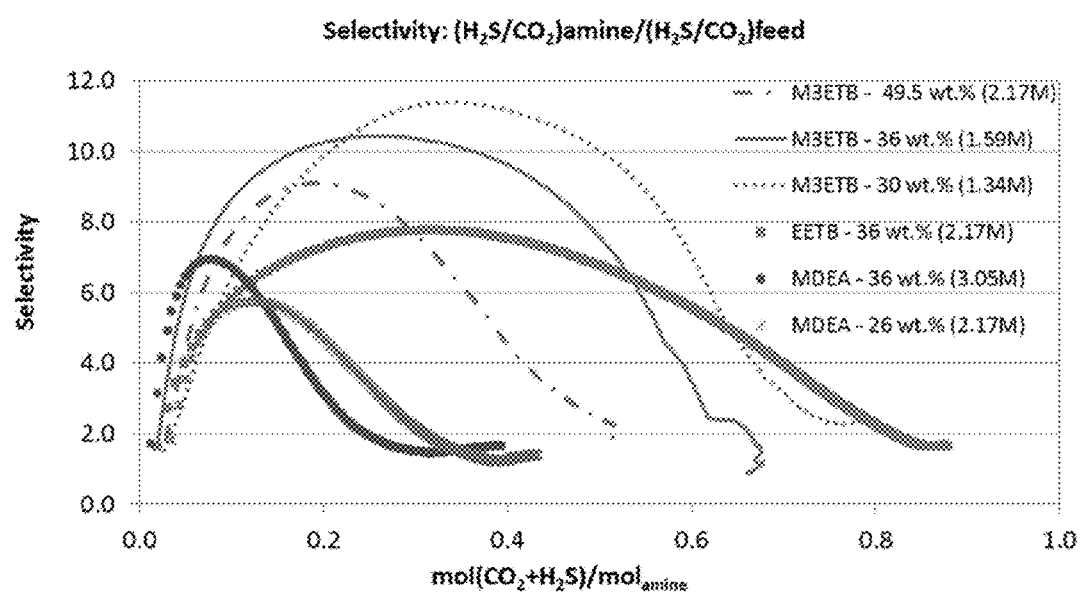
FIG. 4 is a plot of the selectivity of $H_2S$ over $CO_2$ as a function of total acid gas loading with different amine solutions as identified in Table 1.
Figure 5:
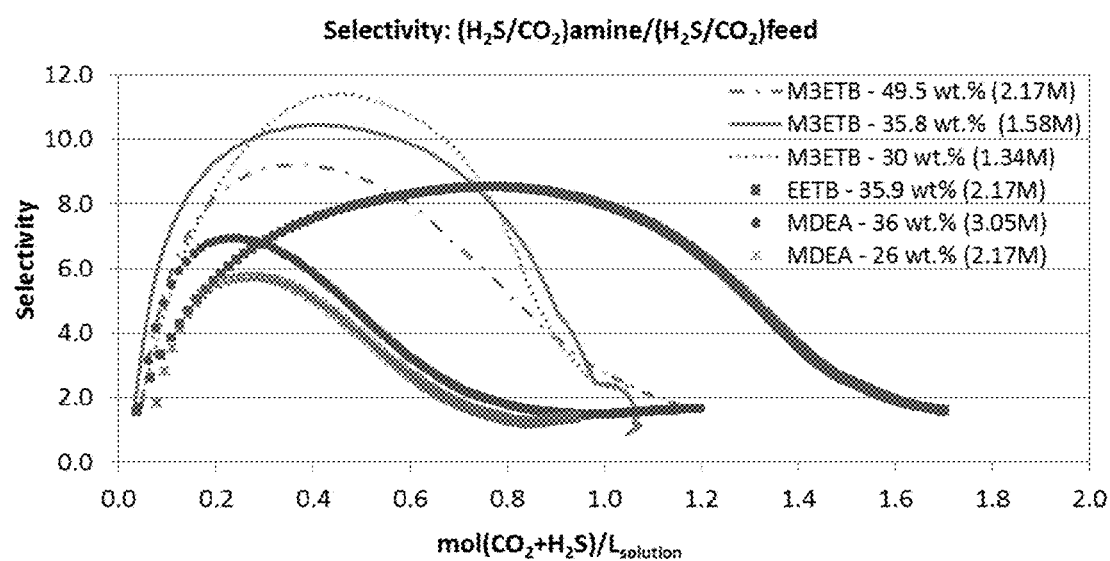
FIG. 5 is a plot of the selectivity of $H_2S$ over $CO_2$ as a function of total acid gas loading per volume of amine solution.

FIG. 4 is a plot of the selectivity of $H_2S$ over $CO_2$ as a function of total acid gas loading with different amine solutions as identified in Table 1. These selectivity curves show that MDEA selectivity towards $H_2S$ is in general lower than obtained from the more highly sterically hindered secondary amines EETB and M3ETB. This is expected since MDEA is a tertiary and less basic amine. As shown in FIG. 5, the observed MDEA acid gas loadings are also significantly lower than the loadings of the more sterically hindered amines EETB and M3ETB.

Furthermore, FIG. 4 allows one to compare the $H_2S$ selectivity of various M3ETB concentrations in water against EETB at 36 wt % concentration. The 49.5 wt % M3ETB solution provides higher $H_2S$ selectivity for lower acid gas loadings (up to ~0.3 mol/mol amine) when compared with the EETB 36 wt % solution. The 36 wt % M3ETB solution provides an even higher $H_2S$ selectivity over a broader range of acid gas loadings (up to ~0.55 mol/mol amine), and provides the highest $H_2S$ selectivity for lower acid gas loadings (up to ~0.3 mol/mol amine). The 30 wt % M3ETB solution provides even higher selectivity up to higher acid gas loadings (up to ~0.65 mol/mol amine). As can be readily understood by a person having ordinary skill in the art, each of these diluted M3ETB solutions provides an improved $H_2S$ selectivity up to higher acid gas loadings, and can be predictably tuned to meet specific acid gas removal applications.

FIG. 5 is a plot of the selectivity of $H_2S$ over $CO_2$ as a function of total acid gas loading per volume of amine solution. The M3ETB solutions have a higher capability for removing $H_2S$ than MDEA and EETB up to a higher acid gas loading per volume (~0.8 mol/L solution). As can be readily understood by a person having ordinary skill in the art, this represents potential energy savings from a reduced circulation rate when using diluted M3ETB solutions.

Example 2—M3ETB pH Study

Two amine solutions were prepared using M3ETB, a first solution with 36 wt % M3ETB, and a second solution of 36 wt % M3ETB with 0.5 wt % $H_3PO_4$, both in water. Test conditions for Example 2 were as follows: gas feed composition: 10 mol % $CO_2$, 1 mol % $H_2S$, balance $N_2$; gas flow rate: 154 sccm; temperature: 40.8° C., pressure: 1 bar; volume: 15 mL; stirring rate: 200 rpm.

Figure 6:
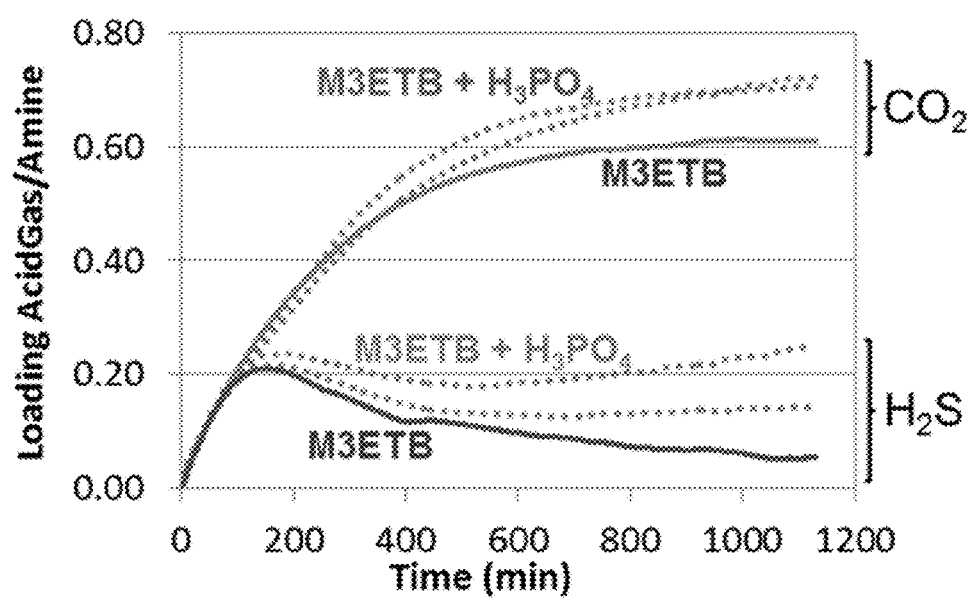
FIG. 6 is a plot of the $CO_2$ and $H_2S$ uptake as a function of treatment time for the 36 wt % M3ETB solutions with and without phosphoric acid.
Figure 7:
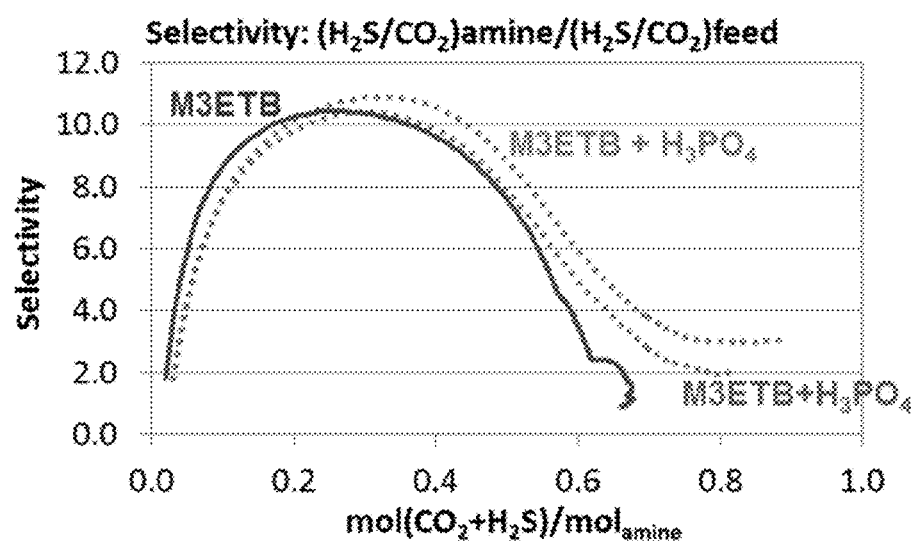
FIG. 7 is a plot of the selectivity of $H_2S$ over $CO_2$ as a function of total loading with M3ETB aqueous solutions with and without phosphoric acid.

The effect of phosphoric acid on M3ETB acid gas absorption behavior can be observed in FIGS. 6 and 7. FIG. 6 is a plot of the $CO_2$ and $H_2S$ uptake as a function of treatment time for the 36 wt % M3ETB solutions with and without phosphoric acid. FIG. 7 is a plot of the selectivity of $H_2S$ over $CO_2$ as a function of total loading with M3ETB aqueous solutions with and without phosphoric acid. The presence of phosphoric acid increases the loading of both $CO_2$ and $H_2S$ gases, thereby impacting the selectivity. This result is in line with the prior conclusion from Example 1 that bicarbonate formation is favored with lower pH, thereby increasing the free amine concentration in solution available for rapid $H_2S$ capture.

Example 3—MDEA pH Study (Comparative)

Two amine solutions were prepared using MDEA, a first solution with 36 wt % MDEA, and a second solution of 36 wt % MDEA with 0.5 wt % $H_3PO_4$, both in water. Test conditions for Example 2 were as follows: gas feed composition: 10 mol % $CO_2$, 1 mol % $H_2S$, balance $N_2$; gas flow rate: 154 sccm; temperature: 40.8° C., pressure: 1 bar; volume: 15 mL; stirring rate: 200 rpm.

Figure 8:
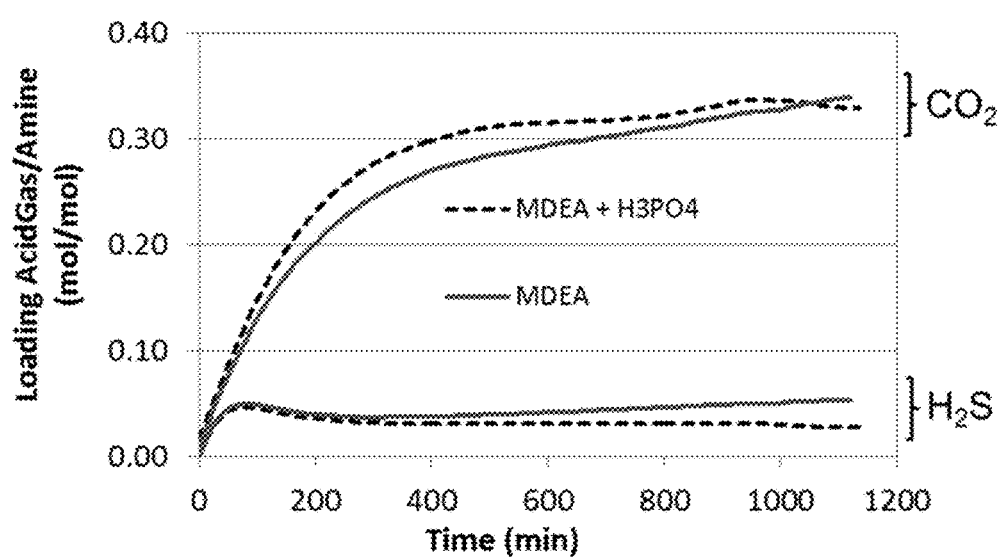
FIG. 8 is a plot of the $CO_2$ and $H_2S$ uptake as a function of treatment time for the 36 wt % MDEA solutions with and without phosphoric acid.
Figure 9:
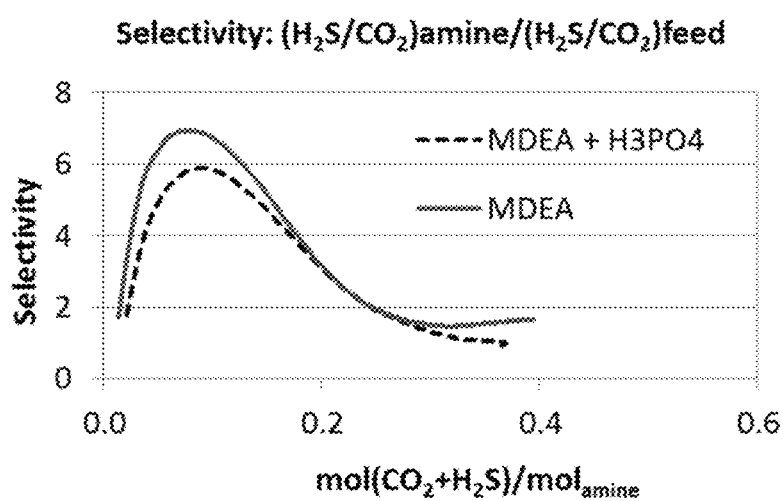
FIG. 9 is a plot of the selectivity of $H_2S$ over $CO_2$ as a function of total loading with MDEA aqueous solutions with and without phosphoric acid.

The effect of phosphoric acid on MDEA acid gas absorption behavior can be observed in FIGS. 8 and 9. FIG. 8 is a plot of the $CO_2$ and $H_2S$ uptake as a function of treatment time for the 36 wt % MDEA solutions with and without phosphoric acid. FIG. 9 is a plot of the selectivity of $H_2S$ over $CO_2$ as a function of total loading with MDEA aqueous solutions with and without phosphoric acid. There is no significant difference observed because it is known that bicarbonate is preferentially formed during $CO_2$-MDEA reactions. Nevertheless, it is observed that the acidified MDEA solution may lead to slightly higher bicarbonate formation. FIG. 9 in particular demonstrates a reduced $H_2S$ selectivity for the MDEA solution with phosphoric acid, which is the opposite effect as the highly sterically hindered M3ETB.

Additional Embodiments

According to certain teachings of the present invention, a process a process for selectively separating H2S from a gas mixture which also comprises CO2 is disclosed, the process comprising contacting a stream of the gas mixture with an absorbent solution comprising one or more amines. The H2S/CO2 selectivity of the absorbent solution is greater than about 4.0, and preferably greater than 5.0, for an acid gas loading [mol($CO_2$+$H_2S$)/mol(amine)] between about 0.2 and about 0.6. The one or more amines is selected from the group consisting of amines, alkanolamines, sterically hindered akanolamines, and mixtures thereof, and is preferably methoxyethoxyethoxyethanol-t-butylamine (M3ETB), ethoxyethanol-t-butylamine (EETB), or N-methyldiethanolamine (MDEA). The sterically hindered alkanolamine is preferably a capped amine.

Another embodiment of the present invention is a method for increasing the selectivity of an absorption process for $H_2S$ absorption from a gas mixture which also comprises $CO_2$, the absorption process having an absorbent solution comprising one or more amines, the method comprising reducing the pH of the absorbent solution. This pH reducing step is accomplished by diluting the absorbent solution, or by adding an acid to the absorbent solution, the acid being selected from phosphoric acid and sulfuric acid. The one or more amines is selected from the group consisting of amines, alkanolamines, sterically hindered akanolamines, and mixtures thereof, and is preferably M2ETB, EETB, or MDEA.

Yet another embodiment of the present invention is a process for selectively separating $H_2S$ from a gas mixture which also comprises $CO_2$, the process comprising contacting a stream of the gas mixture with an absorbent solution comprising M3ETB. The M3ETB concentration in the absorbent solution is less than about 36 wt %, and preferably between 25 and 30 wt %. The $H_2S/CO_2$ selectivity of the absorbent solution is greater than about 4.0, and preferably greater than 5.0, for an acid gas loading [mol($CO_2$+$H_2S$)/mol(amine)] range between about 0.2 and about 0.6.

Still another embodiment of the present invention is a system for selectively absorbing $H_2S$ from a raw gas stream which also comprises $CO_2$, the system comprising an absorber tower for contacting the raw gas stream countercurrently with an aqueous amine stream to create a spent amine stream comprising at least a portion of the $H_2S$ from the raw gas stream, and a regeneration tower for creating a regenerated amine stream and a desorbed acid gas stream. The $H_2S/CO_2$ selectivity of the aqueous amine stream is greater than about 4.0, preferably greater than about 5.0, for an acid gas loading [mol($CO_2$+$H_2S$)/mol (amine)] between about 0.2 and about 0.6. The aqueous amine stream preferably comprises methoxyethoxyethoxyethanol-t-butylamine (M3ETB) in a concentration less than about 36 wt %, and preferably between 25 and 30 wt %. The $H_2S/CO_2$ selectivity of the system is increased by reducing the pH of the aqueous amine stream, preferably by lowering the amine concentration in the aqueous amine stream.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings therein. Furthermore, no limitations are intended to the details of construction or design herein shown, other than as described in the claims below. It is therefore evident that the particular illustrative embodiments disclosed above may be altered or modified and all such variations are considered within the scope and sprit of the present invention. Unless otherwise indicated, all numbers expressing quantities of ingredients, properties, reaction conditions, and so forth, used in the specification and claims are to be understood as approximations based on the desired properties sought to be obtained by the present invention, and the error of measurement, etc., and should at least be construed in light of the number of reported significant digits and by applying ordinary rounding techniques. Whenever a numerical range with a lower limit and an upper limit is disclosed, a number falling within the range is specifically disclose. Moreover, the indefinite articles "a" or "an", as use in the claims, are defined herein to mean one or more than one of the element that it introduces.

What is claimed is:

1. A process for selectively separating $H_2S$ from a gas mixture which also comprises $CO_2$, the process comprising:
   contacting a stream of the gas mixture with an absorbent solution comprising methoxyethoxyethoxyethanol-t-butylamine (M3ETB);
   wherein the M3ETB concentration in the absorbent solution is between 20 and 30 wt %.

2. The process of claim 1, wherein the M3ETB concentration in the absorbent solution is between 25 and 30 wt %.

3. The process of claim 1, wherein the $H_2S/CO_2$ selectivity of the absorbent solution is greater than about 5.0 over the entire acid gas loading [mol($CO_2+H_2S$)/mol(amine)] range between 0.2 and 0.55.

4. The process of claim 1, wherein the $H_2S/CO_2$ selectivity of the absorbent solution is greater than about 6.0 over the entire acid gas loading [mol($CO_2+H_2S$)/mol(amine)] range between 0.2 and 0.55.

5. The process of claim 1, wherein the $H_2S/CO_2$ selectivity of the absorbent solution is greater than about 7.0 over the entire acid gas loading [mol($CO_2+H_2S$)/mol(amine)] range between 0.2 and 0.55.

6. A process for selectively separating $H_2S$ from a gas mixture which also comprises $CO_2$, the process comprising:
   contacting a stream of the gas mixture with an absorbent solution comprising methoxyethoxyethoxyethanol-t-butylamine (M3ETB);
   wherein the M3ETB concentration in the absorbent solution is between 25 and 30 wt %.

7. The process of claim 6, wherein the $H_2S/CO_2$ selectivity of the absorbent solution is greater than about 5.0 over the entire acid gas loading [mol($CO_2+H_2S$)/mol(amine)] range between 0.2 and 0.55.

8. The process of claim 6, wherein the $H_2S/CO_2$ selectivity of the absorbent solution is greater than about 6.0 over the entire acid gas loading [mol($CO_2+H_2S$)/mol(amine)] range between 0.2 and 0.55.

9. The process of claim 6, wherein the $H_2S/CO_2$ selectivity of the absorbent solution is greater than about 7.0 over the entire acid gas loading [mol($CO_2+H_2S$)/mol(amine)] range between 0.2 and 0.55.

* * * * *